(12) United States Patent
Kai et al.

(10) Patent No.: US 7,841,620 B2
(45) Date of Patent: Nov. 30, 2010

(54) VEHICLE AIRBAG DEVICE

(75) Inventors: Takeshi Kai, Wako (JP); Takeru Fukuda, Wako (JP); Takeshi Fujimaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 136 days.

(21) Appl. No.: 12/323,870

(22) Filed: Nov. 26, 2008

(65) Prior Publication Data

US 2009/0134610 A1 May 28, 2009

(30) Foreign Application Priority Data

Nov. 27, 2007 (JP) ............................. 2007-305905

(51) Int. Cl.
*B60R 21/20* (2006.01)
(52) U.S. Cl. ................................. 280/728.3
(58) Field of Classification Search .............. 280/728.3, 280/730.2, 731
See application file for complete search history.

(56) References Cited

U.S. PATENT DOCUMENTS

| 6,601,870 | B2* | 8/2003 | Suzuki et al. ............ 280/728.3 |
| 6,742,804 | B2* | 6/2004 | Suzuki et al. ............ 280/728.3 |
| 6,848,705 | B2* | 2/2005 | Schneider et al. ........ 280/728.3 |
| 2002/0005631 | A1* | 1/2002 | Varcus et al. ............ 280/728.3 |
| 2005/0275197 | A1* | 12/2005 | Kaifuki et al. ........... 280/728.3 |
| 2009/0058055 | A1* | 3/2009 | Fujimori et al. ............. 280/731 |

FOREIGN PATENT DOCUMENTS

| CN | 1712279 | | 12/2005 |
| JP | 10-129382 | | 5/1998 |
| JP | 2002-067865 | | 3/2002 |
| JP | 2002-187516 | | 7/2002 |
| JP | 2005067466 A | * | 3/2005 |
| JP | 2006001326 A | * | 1/2006 |
| JP | 2006-036141 | | 2/2006 |
| JP | 2006273244 A | * | 10/2006 |
| JP | 2007-290409 | | 11/2007 |
| JP | 2007-302184 | | 11/2007 |
| JP | 2008238951 A | * | 10/2008 |

\* cited by examiner

*Primary Examiner*—Faye M. Fleming
(74) *Attorney, Agent, or Firm*—Rankin, Hill & Clark LLP (57) ABSTRACT

An airbag device provided in a side of a vehicle seat, which device comprises a case for accommodating a folded airbag. The case has a lid and a wall. The lid has tear lines formed so as to rupture when the airbag deploys and separate the lid into a plurality of parts. A hinge is formed on a boundary between the lid and the wall.

5 Claims, 8 Drawing Sheets

VEHICLE AIRBAG DEVICE

FIELD OF THE INVENTION

The present invention relates to a vehicle airbag device, and particularly to a side airbag provided in the side of a vehicle seat.

BACKGROUND OF THE INVENTION

In vehicle airbag devices; e.g., a side airbag, a bag is deployed between a passenger and a side wall to which a door is provided. There are known side airbags, such as disclosed in Japanese Patent No. 3330032, wherein, when a lid corresponding to an outlet of a rectangular box in which the bag is housed is pushed open by the bag, two tear lines formed in the lid rupture as the bag deploys and opens.

In another example of a side airbag, a box in which a bag is housed and a holder into which the box has been fitted open in a consecutive manner. Specifically, there are known side airbags, such as disclosed in Japanese Patent No. 3752527, wherein an outlet wall of the box in which the bag is housed begins to open as a result of the deployment of the bag, whereupon a front wall of the holder ruptures on being pushed by the outlet wall, whereby the bag opens.

However, the side airbags disclosed in Japanese Patent No. 3330032 and Japanese Patent No. 3752527 are problematic in that an outlet wall, a front wall, and a lid corresponding to an outlet all rupture; and the pressing load (resistance) increases.

In side airbags, when significant resistance is experienced in opening the lid or outlet wall, the shape of the deployed airbag will vary widely depending upon the configuration in which the vehicle deforms.

SUMMARY OF THE INVENTION

It is therefore an object of the present invention to provide a vehicle airbag device that reduces the resistance when the lid is opened in the opening direction.

According to an aspect of the present invention, there is provided a vehicle airbag device which comprises an airbag, and a case for accommodating the airbag in a folded state. The case comprises a lid positioned in a direction of deployment of the airbag, a wall for restricting deployment of the airbag in the deployment direction, a plurality of tear lines provided in the lid such that the lines rupture when the airbag deploys and separate the lid into a plurality of parts, and a plurality of hinge parts positioned on a boundary between each of the separated lid parts and the wall.

In this arrangement, a decrease will thus occur in the resistance encountered when the hinge parts are folded back as the separated plurality of lid parts is opened. It is accordingly possible to reduce the resistance when the lid is opened in the opening direction.

Preferably, each of the tear lines has a secondary tear line formed extending from respective distal ends of the tear lines to the wall. The resistance that ruptures the distal ends of the tear lines accordingly decreases, and it is possible to further reduce the resistance when the lid is opened in the opening direction.

Desirably, the lid is formed to a narrow width in the direction in which the airbag deploys. Specifically, the lid is formed from a center part that is disposed perpendicularly with respect to the direction in which the airbag deploys, and slanted parts that communicate with either end of the center part and are formed at a slant. Specifically, the lid will separate into the center part and the slanted parts connected to either end thereof, a decrease will occur in the folding resistance generated in the hinge parts when each of the lid parts is opened, and it will be possible to reduce the resistance encountered when the lid is opened in the opening direction.

The wall may be formed in a polygonal configuration, and each of the tear lines may be formed in correspondence with a vertex of the polygonal shape. Specifically, each of the hinge parts supporting each of the lid parts separated by the rupturing of the tear lines is linear in shape, a decrease will occur in the folding resistance generated in the hinge parts when the lid is opened, and it will be possible to reduce the resistance encountered when the lid is opened in the opening direction.

The hinge strength of each of the hinge parts differs according to the separated lid part. It is accordingly possible to establish a design to allow the bending resistance of each of the hinge parts to correspond to the pressures generated when the airbag deploys and the separated lid parts are opened. It is also possible to minimize the resistance, and further reduce the force expended in deforming the hinge parts. Specifically, it is possible to minimize any adverse effect caused by the deformation-resistance of the hinge parts.

BRIEF DESCRIPTION OF THE DRAWINGS

Certain preferred embodiments of the present invention will be described in detail below, by way of example only, with reference to the accompanying drawings, in which:

FIGS. 3A to 3D are schematic views of a case of the airbag device shown in FIG. 2, wherein

DETAILED DESCRIPTION OF THE PREFERRED EMBODIMENTS

Figure 1A:
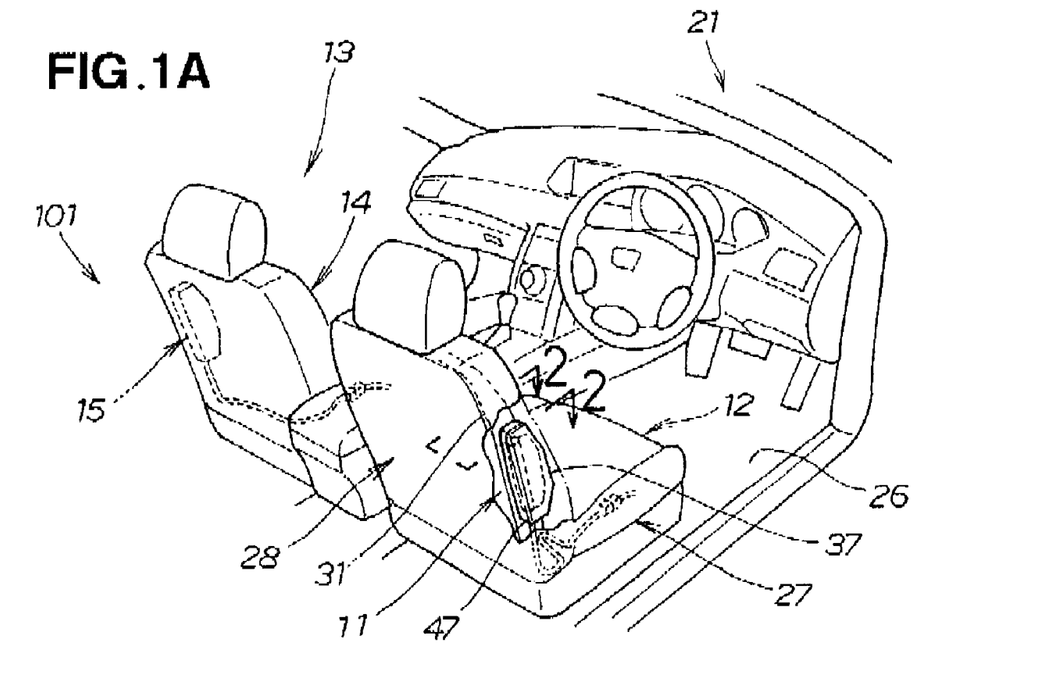
FIGS. 1A and 1B are drawings showing a vehicle equipped with a vehicle airbag device according to one embodiment of the present invention.
Figure 1B:
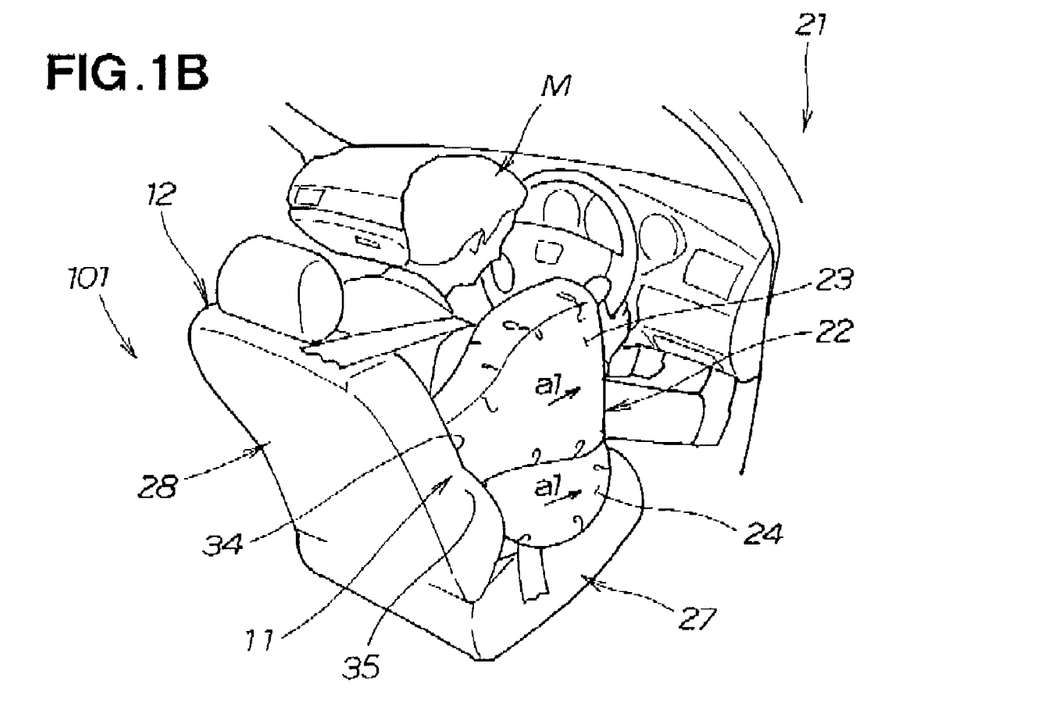

As shown in FIGS. 1A and 1B, a vehicle airbag device 11 is a driver seat side airbag device disposed in a driver seat 12, and is included in an airbag system 13.

The airbag system 13 comprises an airbag device (a driver seat side airbag device) 11, a passenger seat side airbag device 15 disposed in a passenger seat 14, and a control device (not shown) for controlling the driver seat side airbag device 11 and the passenger seat side airbag device 15.

When the right-side surface of a vehicle 21 sustains an impact, the driver seat side airbag device 11 deploys an airbag 22 from the right side of a driver M on the basis of right-side surface collision information from the control device.

The airbag 22 has a first bag 23 and a second bag 24, and protects the occupant of the driver seat 12. The second bag 24 may or may not be provided, as desired.

The direction in which the airbag 22 deploys is the direction towards the front of the vehicle (the direction indicated by arrow a1).

The driver seat 12 has a seat cushion 27 attached to an underbody 26, and a seat back 28 reclinably attached to the seat cushion 27.

Figure 2:
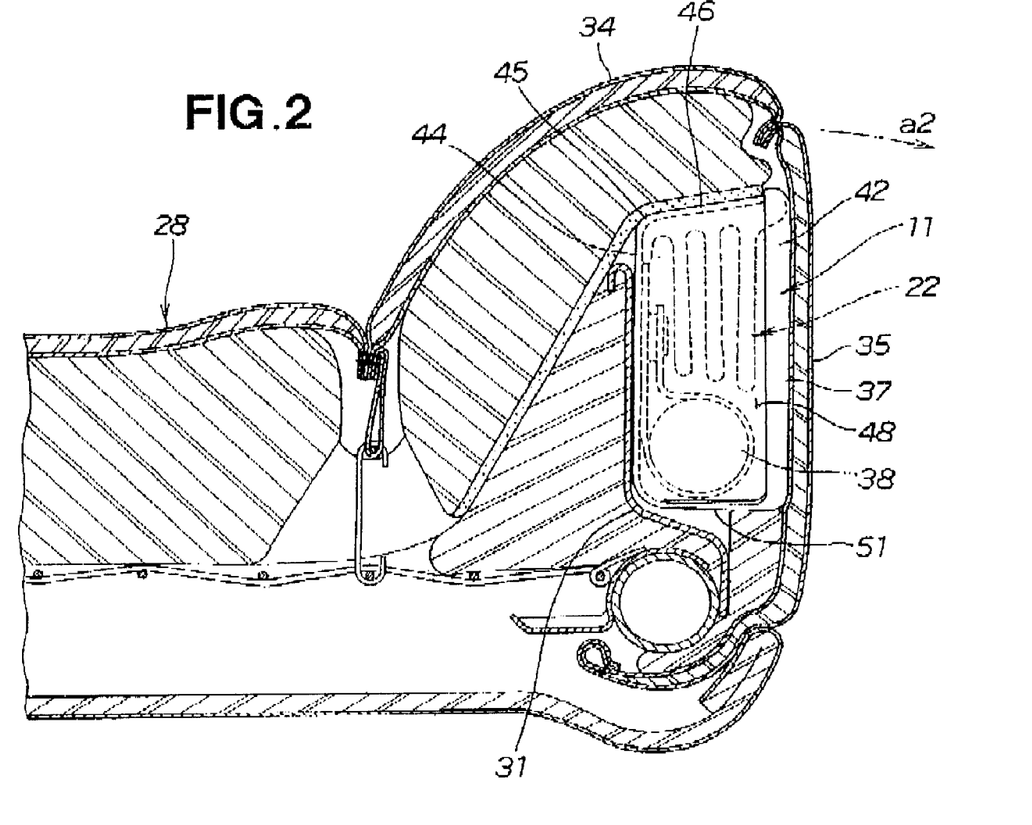
FIG. 2 is an enlarged cross-sectional view taken along line 2-2 of FIG. 1.
Figure 3A:
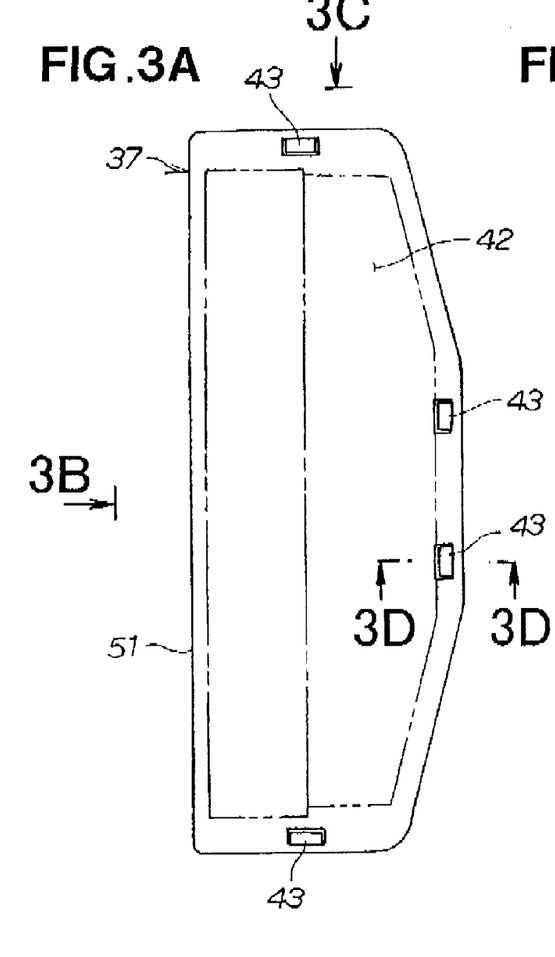
Figure 3B:
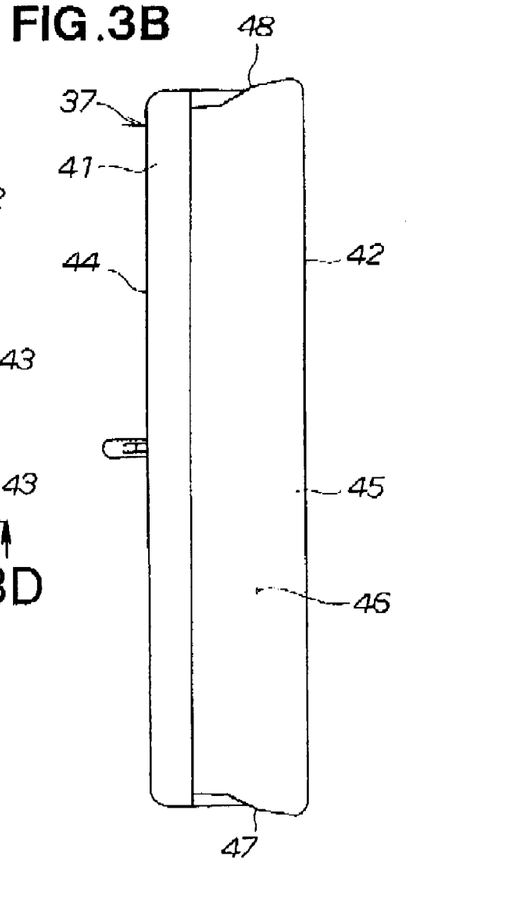
FIG. 3B is a view as seen in the direction of arrow 3B of FIG. 3A.
Figure 3C:
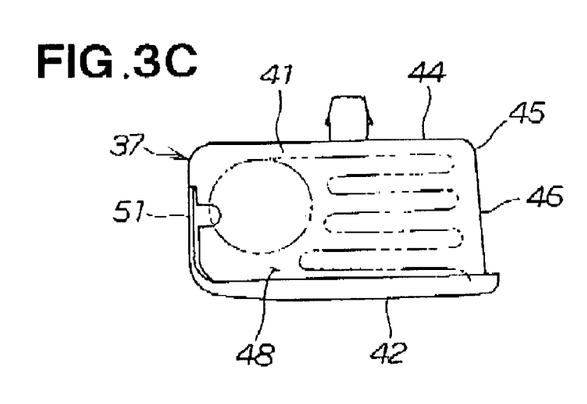
FIG. 3C is a perspective view as seen in the direction of arrow 3C of FIG. 3A.
Figure 3D:
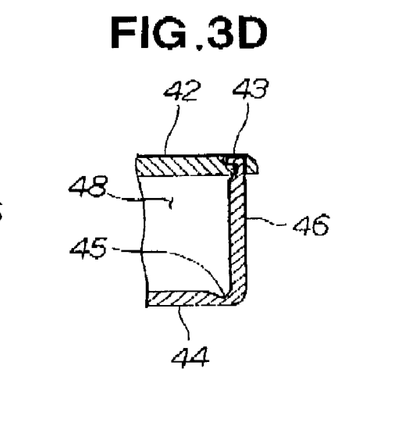
FIG. 3D is a cross-sectional view taken along line 3D-3D of FIG. 3A.

As shown in FIG. 2, the seat back 28 has a right support part 34. A plastic side part 35 is sewn onto the right support part 34 so as to be able to open in the direction indicated by arrow a2. The vehicle airbag device (driver seat side airbag device) 11 is attached to a seat back frame 31 on the inside of the side part 35.

The driver seat side airbag device 11 specifically comprises a case 37 attached to the seat back frame 31, an inflator 38 provided inside the case 37, and the airbag 22, which is connected to the inflator 38 and folded up within the case 37.

FIGS. 3A to 3D show the case 37 of the vehicle airbag device 11.

The case 37 has a container 41 and a cover 42 attached to the container 41 so as to be capable of opening and closing. When the cover 42 is closed, the cover 42 is latched using a clamp 43.

The container 41 comprises a wall 44 supported on a side of the vehicle 21 (see FIG. 1); i.e., on the seat back frame 31, a lid 46 vertically integrated with the wall 44 along a hinge 45, a bottom wall 47, a ceiling 48, and a rear wall 51. The case 37 is made of a plastic material.

As shown in FIGS. 4A to 4D, and FIG. 5, the wall 44 of the container 41 is hexagonal as seen when the case 37 is viewed in isolation from the front (as in FIG. 4A), and has a first vertex 52, a second vertex 53, a third vertex 54, and a fourth vertex 55 provided sequentially from the top; a first front edge 56 running from the first vertex 52 to the second vertex 53; a center front edge 57 running from the second vertex 53 to the third vertex 54; and a second front edge 58 running from the third vertex 54 to the fourth vertex 55. The lid 46 is formed on the first front edge 56, the center front edge 57, and the second front edge 58 with the hinge 45 interposed therebetween.

The lid 46 assumes the shape of a plate having three surfaces. A center part 61 facing in the direction in which the airbag 22 deploys (the direction of arrow a1) is parallel to the rear wall 51, a first slanted part 63 is formed in communication with one end part 62 of the center part 61, and a second slanted part 65 is formed in communication with another end part 64 of the center part 61.

Figure 4A:
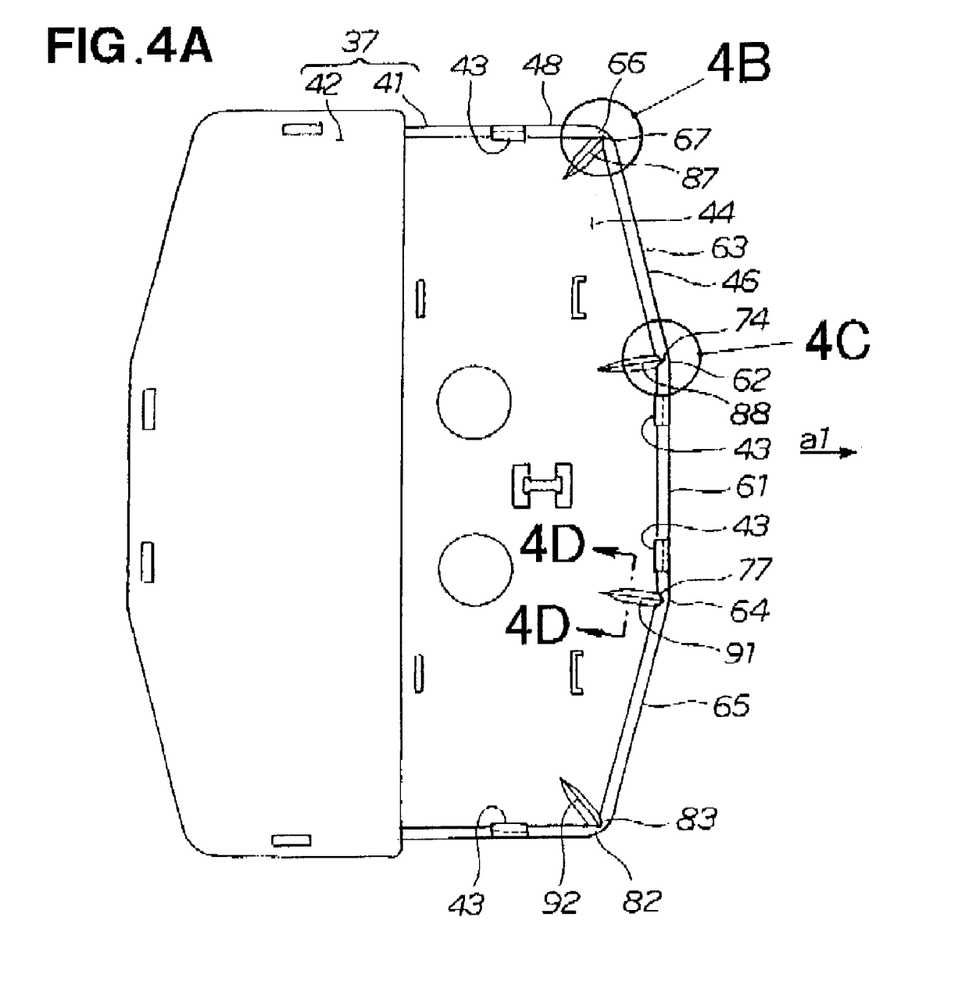
FIG. 4A is a schematic view showing a state in which a cover of the case of FIG. 3A has been opened.
Figure 4B:
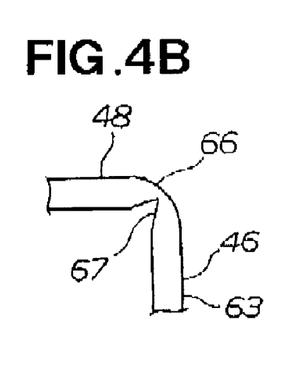
FIG. 4B is an enlarged view of section 4B of FIG. 4A.
Figure 4C:
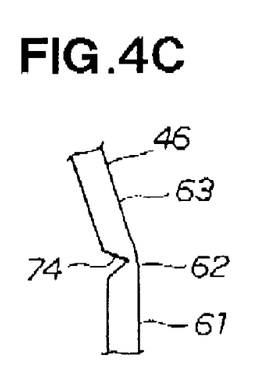
FIG. 4C is an enlarged view of the 4C section of FIG. 4A.
Figure 4D:
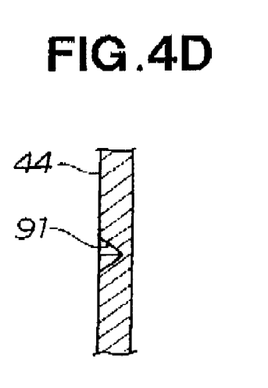
FIG. 4D is a cross-sectional view taken along line 4D-4D in FIG. 4A.
Figure 5:
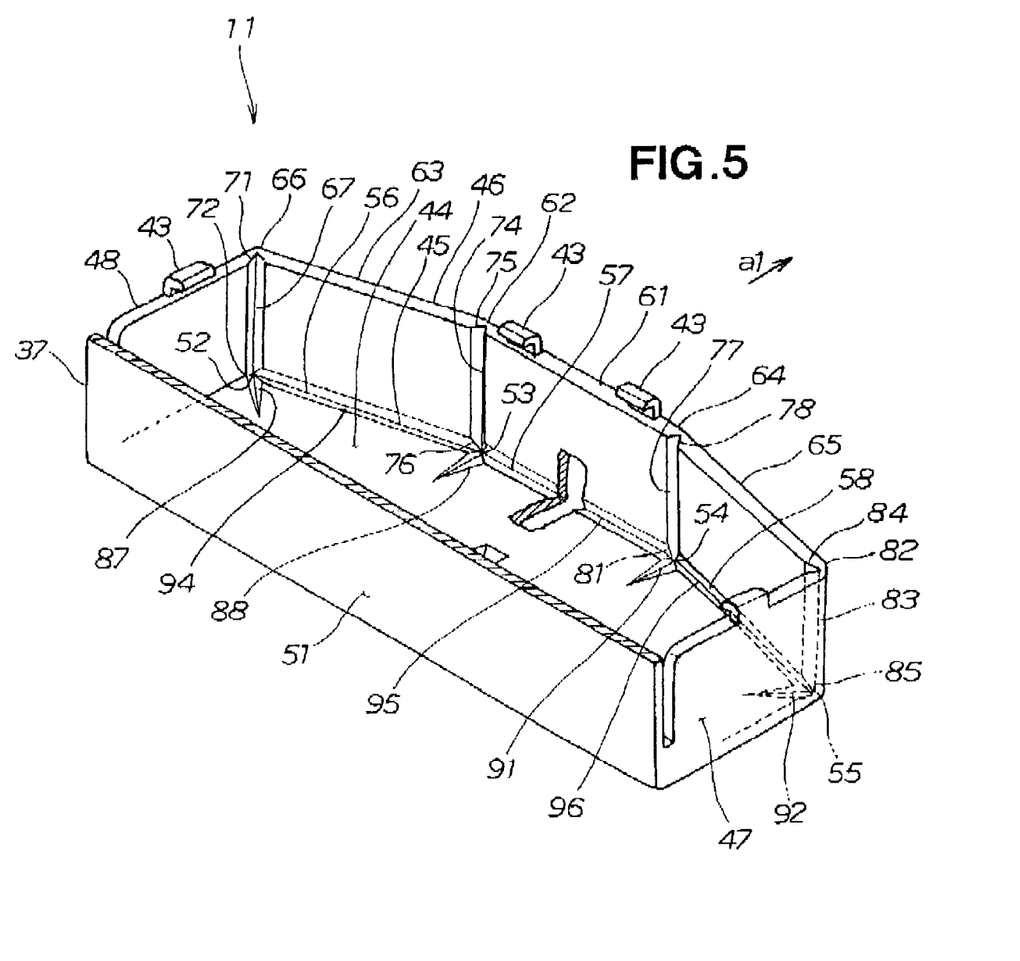
FIG. 5 is a perspective view of the case shown in FIG. 4A.

The surface of the first slanted part 63 is a first surface, the surface of the center part 61 is a second surface, and the surface of the second slanted part 65 is a third surface.

A first tear line 67 is formed in a straight line from an originating end 71 to a terminating end 72 on an inside surface of a first boundary part 66 formed by the ceiling 48 and the first slanted part 63; a second tear line 74 is formed in a straight line from an originating end 75 to a terminating end 76 on an inside surface of a second boundary part (one end part) 62 between the first slanted part 63 and the center part 61; a third tear line 77 is formed in a straight line from an originating end 78 to a terminating end 81 on an inside surface of a third boundary part (the other end part) 64 between the center part 61 and the second slanted part 65; and a fourth tear line 83 is formed in a straight line from an originating end 84 to a terminating end 85 on an inside surface of a fourth boundary part 82 between the second slanted part 65 and the bottom wall 47.

On an inside surface of the wall 44 are formed a first secondary tear line 87 in communication with the terminating end 72 of the first tear line 67, a second secondary tear line 88 in communication with the terminating end 76 of the second tear line 74, a third secondary tear line 91 in communication with the terminating end 81 of the third tear line 77, and a fourth secondary tear line 92 in communication with the terminating end 85 of the fourth tear line 83.

The terminating end 72, the terminating end 76, the terminating end 81, and the terminating end 85 are also positioned on the hinge 45, and also correspond to the positions of the first vertex 52, the second vertex 53, the third vertex 54, and the fourth vertex 55.

The hinge 45 comprises a first hinge part 94 formed straight and connecting the first slanted part 63 of the lid 46 to the first front edge 56 of the wall 44, a center hinge part 95 formed straight and connecting the center part 61 of the lid 46 to the center front edge 57, and a second hinge part 96 formed straight and connecting the second slanted part 65 to the second front edge 58 of the lid 46.

The action of the vehicle airbag device of the present invention shall now be described with reference to FIGS. 6 and 7.

Figure 6:
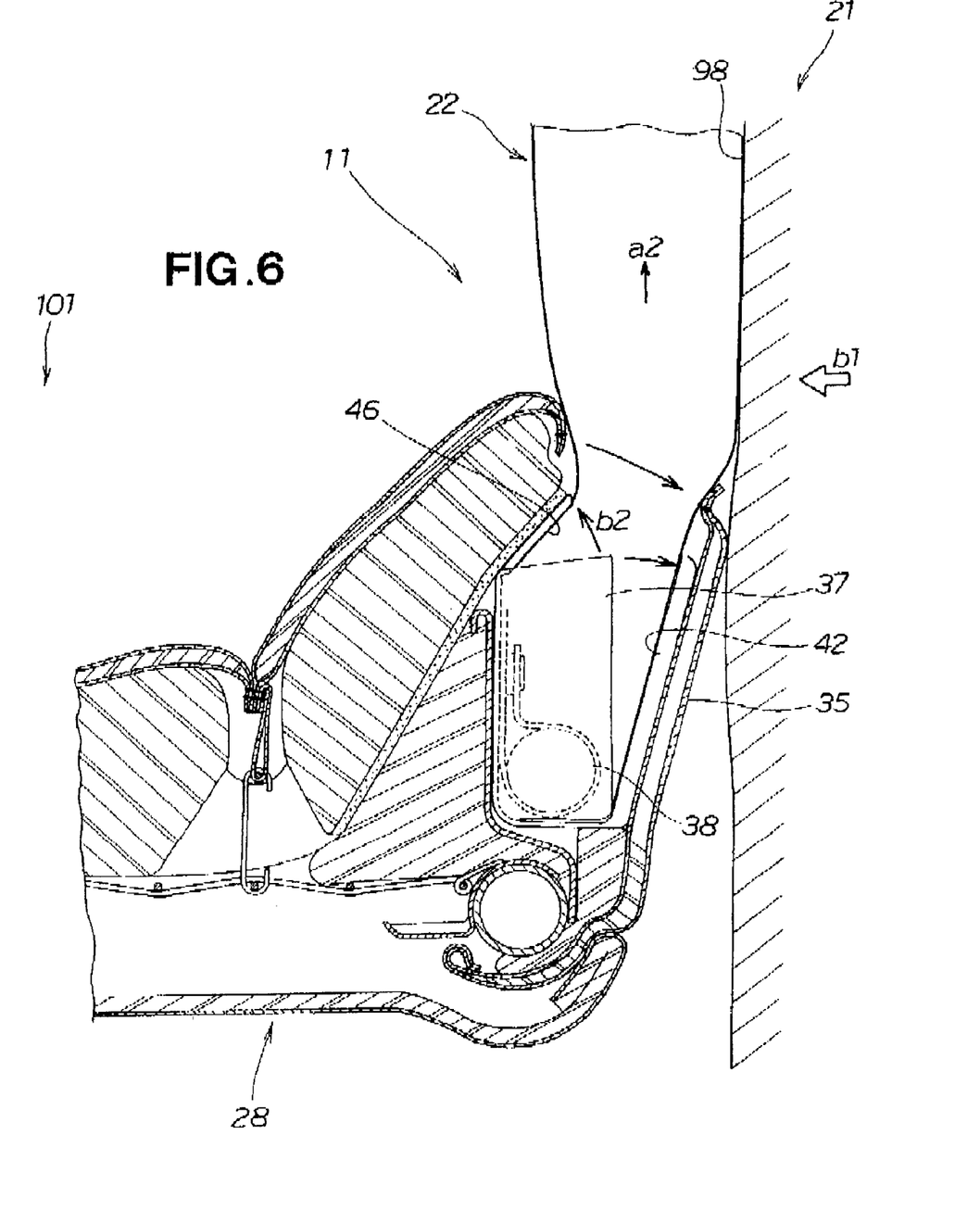
FIG. 6 is a cross-sectional view showing a state in which an airbag is deployed.

As shown in FIG. 6, the inflator 38 of the vehicle airbag device 11 is actuated on the basis of right-side surface collision information from the control device when the right-side surface of the vehicle 21 sustains an impact from another vehicle as indicated by arrow b1. As a result, the airbag 22 begins to expand from gas, pushes open the cover 42 and the lid 46, and deploys between the driver M (see FIG. 1B) and a right front door 98.

The state shown in FIG. 6 is one wherein the right front door 98 and the center pillar have started deforming inwardly with respect to a passenger compartment 101; therefore, the cover 42 is only slightly open.

Figure 7:
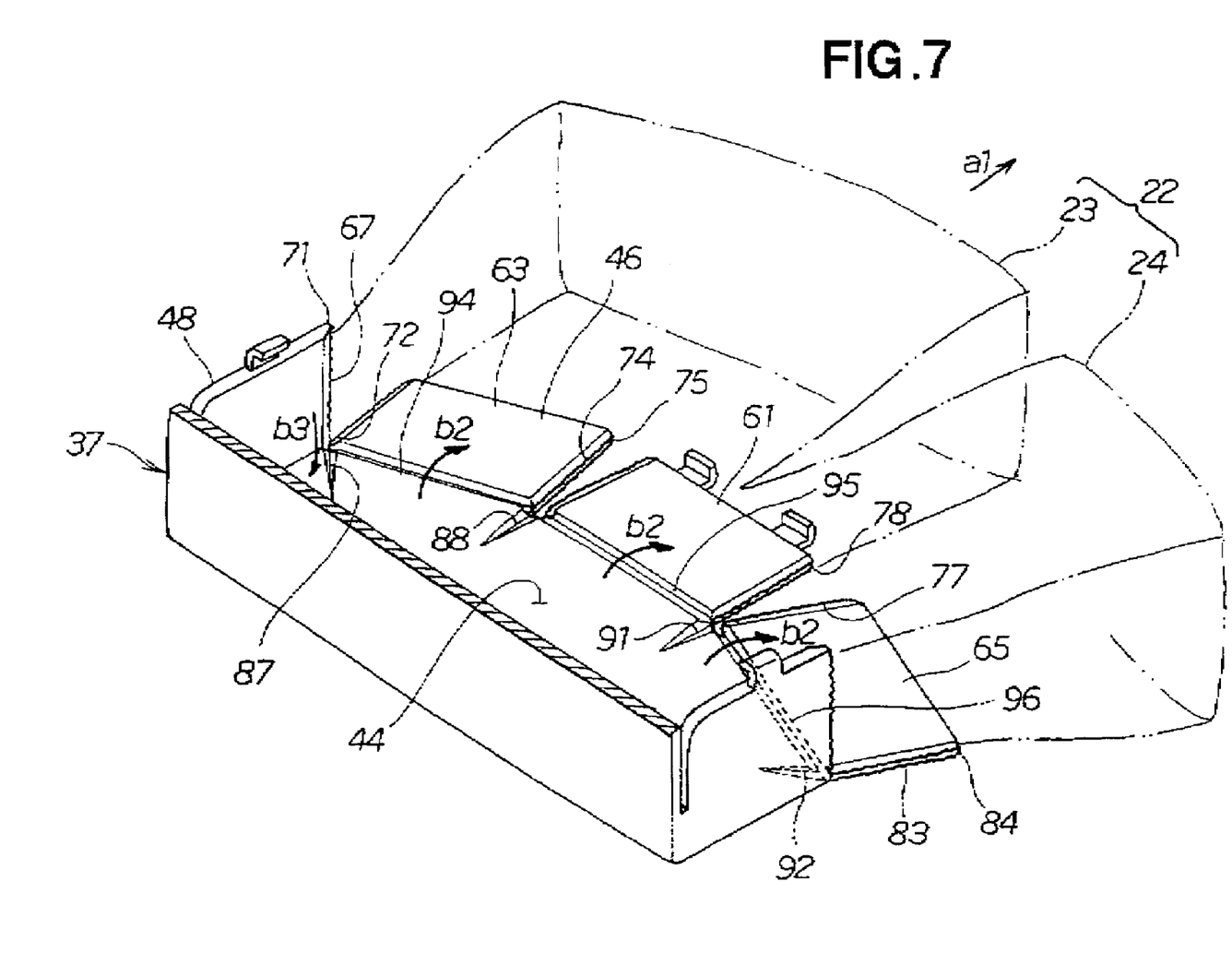
FIG. 7 is a perspective view of the case when the airbag is deployed.

As shown in FIG. 7, when pressure is applied to the inside of the case 37 by the deployment of the airbag 22, rupturing begins at each of the originating ends 71, 75, 78, 84 of the first tear line 67, the second tear line 74, the third tear line 77, and the fourth tear line 83 formed on the lid 46. When the first tear line 67, the second tear line 74, the third tear line 77, and the fourth tear line 83 rupture, the lid 46 separates into three parts; i.e., the first slanted part 63, the center part 61, and the second slanted part 65. As a result, the lid 46 is readily opened and variations in the shape of the deployed airbag 22 can be reduced.

Specifically, when the first tear line 67, the second tear line 74, the third tear line 77, and the fourth tear line 83 begin to rupture, the first slanted part 63, the center part 61, and the second slanted part 65 that are separated by the first tear line 67, the second tear line 74, the third tear line 77, and the fourth tear line 83 begin to open with the first hinge part 94, the center hinge part 95, and the second hinge part 96 acting as respective pivot fulcra. The first hinge part 94, the center hinge part 95, and the second hinge part 96, which are the pivoting fulcra when the first slanted part 63, the center part 61, and the second slanted part 65 open, are formed straight; therefore, less resistance will be encountered when the first hinge part 94, the center hinge part 95, and the second hinge part 96 are opened as indicated by arrow b2. Accordingly, the resistance encountered when the lid 46 is opened in the opening direction (the direction indicated by arrow a1) can be reduced.

Specifically, it is possible to reduce the resistance applied to the airbag 22 when the lid 46 is opened as the airbag 22 goes from a folded state to deploying outside the case 37, and to minimize variations in the shape of the deployed airbag 22.

When the first tear line 67 ruptures from the originating end 71 to the terminating end 72 as the airbag 22 swells, the concentration of stress in the first secondary tear line 87 causes the rupturing to progress as indicated by arrow b3, after having reached the terminating end 72 (the first vertex 52). Specifically, the first secondary tear line 87 ruptures in turn. As a result, the rupture resistance of the first tear line 67 will not increase at the terminating end 72, and it will be possible to further reduce the resistance when the lid 46 is opened in the opening direction (the direction indicated by arrow a1).

Similarly, and at substantially the same time, the second secondary tear line 88 ruptures from the terminating end 76 (the second vertex 53) in continuation from the second tear line 74, the third secondary tear line 91 ruptures from the terminating end 81 (the third vertex 54) in continuation from the third tear line 77, and the fourth secondary tear line 92 ruptures from the terminating end 85 (the fourth vertex 55) in continuation from the fourth tear line 83. It is accordingly possible to further reduce the resistance when the lid 46 is opened in the opening direction (the direction indicated by arrow a1).

FIGS. 8A to 8E show a case 11B according to another embodiment. The same reference symbols are used for the same structures according to the embodiment shown in FIGS. 1 to 7, and a description thereof is not provided here.

Figure 8A:
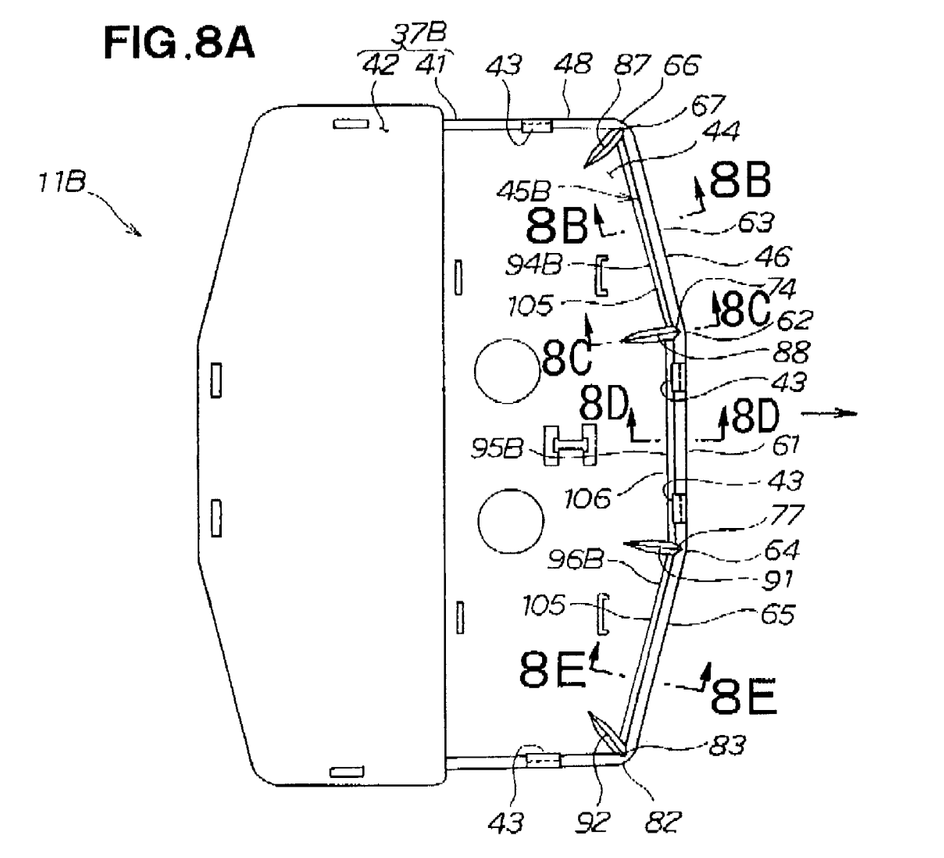
FIG. 8A is a schematic view showing a case according to another embodiment.

In the vehicle airbag device 11B of the second embodiment, the hinge strength of a hinge 45B formed in the case 37 differs in a plurality of locations.

"Hinge strength" is the degree of strength provided when the hinge 45B is bent and caused to deform, and is designed to differ according to the thickness and shape of the hinge 45B.

Specifically, the hinge 45B comprises a first hinge part 94B formed in a straight line by having the first slanted part 63 of the lid 46 be vertically disposed with respect to the first front edge 56, a center hinge part 95B formed in a straight line by having the center part 61 of the lid 46 be vertically disposed with respect to the center front edge 57, and a second hinge part 96B formed in a straight line by having the second slanted part 65 of the lid 46 be vertically disposed with respect to the second front edge 58. The hinge parts of the vertices 53, 54 shown in FIG. 5 are formed to a thickness t2 (see FIG. 8C).

Figure 8B:
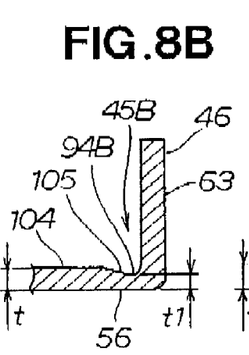
FIG. 8B is an enlarged-scale cross-sectional view taken along line 8B-8B of FIG. 8A.

The first hinge part 94B is formed to a thickness t1, as a result of a horizontal part 104 of the wall 44 being formed to a thickness t, and becoming progressively thinner in a tapered shape (taper 105) from a vicinity of the first hinge part 94B toward the corner part.

Figure 8C:
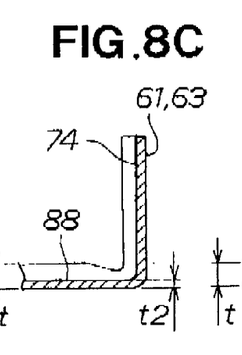
FIG. 8C is an enlargement of a cross-sectional view taken along line 8C-8C in FIG. 8A.

The horizontal part 104 becomes progressively thinner in a tapered shape (taper 106) from a vicinity of the center hinge part 95B toward the corner part, whereby the center hinge part 95B is formed to a thickness t3.

Figures 8D, 8E:
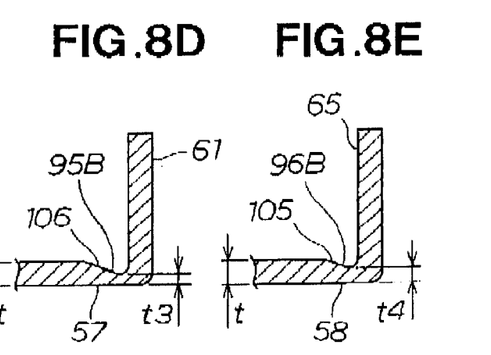
FIG. 8D is an enlarged-scale cross-sectional view taken along line 8D-8D of FIG. 8A.
FIG. 8E is an enlarged-scale cross-sectional view taken along line 8E-8E of FIG. 8A.

The second hinge part 96B, in the same manner as the first hinge part 94B, becomes progressively thinner in a tapered shape (taper 105), thereby being formed to a thickness t4.

The thicknesses t1 to t4 fulfill the relationship $t2<t3<t1=t4$.

Specifically, the thickness t2 of the hinge parts at the vertices 53, 54 is the lowest value, and is less than the thickness t3 of the center hinge part 95B.

The airbag device 11B of the second embodiment is employed in cases where the conditions are such that the pressure applied to the first slanted part 63 and the second slanted part 65 of the lid 46 is greater than the pressure of the airbag 22 applied to the center part 61 of the lid 46. Examples of such conditions include the shape of the seat back 28, and the shape of the first slanted part 63 and the second slanted part 65.

In the airbag device 11B of such description, the airbag 22 begins to deploy, and the pressure resulting from the deployment causes the first to fourth tear lines 67, 74, 77, 83 to rupture, whereupon the lid 46 is opened with the first hinge part 94B, the center hinge part 95B, and the second hinge part 96B used as fulcra. Any variation in the deformation resistance of the first hinge part 94B, the center hinge part 95B, and the second hinge part 96B is minimized, and the lid 46 can be suitably opened even in cases in which the pressure resulting from the deployment of the airbag 22 varies in the vertical direction.

In the second embodiment, as shown in FIGS. 8B to 8E, thicknesses t1 to t4 fulfill the relationship $t2<t3<t1=t4$; however, in cases involving different conditions, thicknesses t1 to t4 may be further modified.

For example, in a case in which differing pressure is received by the first slanted part 63 and the second slanted part 65 as a result of the deployment of the airbag 22, thicknesses t1 to t4 may fulfill the relationship $t2<t3<t1<t4$, or $t2<t3<t4<t1$.

The second embodiment is an example in which the hinge 45B comprises three hinge parts; i.e., the first hinge part 94B, the center hinge part 95B, and the second hinge part 96B. However, even when there are more than three hinge parts, the thicknesses can similarly be varied. In such cases, the strength (bending resistance) of the hinges subjected to great pressure as a result of the deployment of the airbag 22 may be correspondingly increased, and the strength (bending resistance) of the hinges not subjected to great pressure may be correspondingly reduced.

Moreover, the thickness may be varied along the entirety of the hinge in the lengthwise direction. For example, the thickness t1 of the first hinge part 94B may be given a tapering shape so as to be smaller (less than t1) on the outward side on one end (the position of the first vertex 52), and larger (equal to or greater than t1) on the inward side on the other end (the position of the second vertex 53). The strength can be set in a graduated manner (gradually reducing and gradually increasing) within the same hinge part.

The embodiments represent examples of the vehicle airbag device of the present invention being used in a seat; however, the device may be used elsewhere besides in the seat.

The passenger seat side airbag device 15 is substantially the same as the driver seat side airbag device 11.

Obviously, various minor changes and modifications of the present invention are possible in light of the above teaching. It is therefore to be understood that within the scope of the appended claims the invention may be practiced otherwise than as specifically described.

What is claimed is:

1. A vehicle airbag device, comprising:
  a side airbag that is disposed sidewardly of a vehicle seat; and
  a case for accommodating the airbag in a folded state,
  wherein the case comprises:
    a lid positioned in a direction of deployment of the side airbag;
    a wall for restricting deployment of the side airbag in the deployment direction, wherein the wall is supported by a seat back frame of the vehicle seat;
    a plurality of tear lines provided in the lid such that the plurality of tear lines rupture when the side airbag deploys and separate the lid into a plurality of parts;

a plurality of hinge parts positioned on a boundary between each of the separated lid parts and the wall; and a plurality of secondary tear lines provided in the lid that extend from respective distal ends of the plurality of tear lines toward the wall, wherein the secondary tear lines have a thickness less than a thickness of the wall.

2. The device of claim 1, wherein the lid is narrower in width toward the direction of side airbag deployment.

3. The device of claim 1, wherein the lid is comprised of a center part disposed perpendicularly with respect to the direction of side airbag deployment, and slanted parts continuing from opposite ends of the center part in a slanted posture.

4. The device of claim 1, wherein the wall is a polygonal configuration, and each of the tear lines is formed in correspondence with a vertex of the polygonal shape.

5. The device of claim 1, wherein hinge strength of each of the hinge parts differs according to the separated lid part.

* * * * *